(12) United States Patent
Demma

(10) Patent No.: US 8,931,909 B2
(45) Date of Patent: Jan. 13, 2015

(54) DISPLAY APPARATUS FOR A VEHICLE AND METHOD FOR PRODUCING THE DISPLAY APPARATUS

(75) Inventor: Dino Demma, Ruesselsheim (DE)

(73) Assignee: GM Global Technology Operations LLC, Detroit, MI (US)

(*) Notice: Subject to any disclaimer, the term of this patent is extended or adjusted under 35 U.S.C. 154(b) by 355 days.

(21) Appl. No.: 13/441,336

(22) Filed: Apr. 6, 2012

(65) Prior Publication Data

US 2012/0255208 A1 Oct. 11, 2012

(30) Foreign Application Priority Data

Apr. 8, 2011 (DE) .......................... 10 2011 016 428

(51) Int. Cl.
| | | |
|---|---|---|
| *G01D 11/28* | (2006.01) | |
| *G01D 13/20* | (2006.01) | |
| *F21V 9/16* | (2006.01) | |
| *B60Q 3/04* | (2006.01) | |
| *F21V 8/00* | (2006.01) | |
| *B60K 37/02* | (2006.01) | |

(52) U.S. Cl.
CPC ............... *G02B 6/0041* (2013.01); *B60Q 3/04* (2013.01); *B60K 37/02* (2013.01); *G02B 6/006* (2013.01); *B60K 2350/2039* (2013.01); *B60K 2350/2065* (2013.01); *B60K 2350/2095* (2013.01); *B60K 2350/402* (2013.01); *B60K 2350/408* (2013.01); *B60K 2350/203* (2013.01)
USPC .......... 362/23.16; 362/84; 362/489; 362/510; 362/511; 362/602; 116/287

(58) Field of Classification Search
CPC ............... F21V 9/16; F21V 9/08; F21V 9/10; F21V 13/14; F21V 3/0481; G01D 13/20; G01D 13/28; G01D 7/06; G01D 13/265; Y10S 116/05; B60Q 3/044; B60K 2350/203; B60K 2350/402; B60K 2350/408; B60K 37/02; B60K 2350/2095; G02B 6/0041
USPC ................ 362/23.09, 23.1, 23.16, 23.17, 84, 362/602–605, 615, 629, 489, 510, 511; 116/286, 287, 288, DIG. 36; 40/542–544, 546, 547
See application file for complete search history.

(56) References Cited

U.S. PATENT DOCUMENTS

| | | | |
|---|---|---|---|
| 4,779,166 A | * | 10/1988 | Tanaka et al. .................. 362/629 |
| 5,124,890 A | | 6/1992 | Choi et al. |

(Continued)

FOREIGN PATENT DOCUMENTS

| | | |
|---|---|---|
| DE | 4313530 A1 | 10/1994 |
| DE | 19749084 A1 | 4/1999 |

(Continued)

OTHER PUBLICATIONS

German Patent Office, German Search Report dated Dec. 23, 2011 for German Application No. 102011016428.6.

*Primary Examiner* — Alan Cariaso
(74) *Attorney, Agent, or Firm* — Ingrassia Fisher & Lorenz, P.C.

(57) ABSTRACT

A display apparatus for a vehicle and a method for producing the display apparatus are described. The display apparatus comprises a transparent plastic plate having a front side, a rear side, and an edge surface surrounding the plastic plate. The display apparatus has a switchable light source of visible light directed onto the edge surface of the plastic plate. The plastic plate has transparent display elements that are disposed as limited zones inside the plastic plate and have light-sensitive dopant particles. When the light source is switched on, the dopant particles scatter the light so that the display elements become visible from the front side.

13 Claims, 10 Drawing Sheets

(56) References Cited

U.S. PATENT DOCUMENTS

| | | | |
|---|---|---|---|
| 5,743,616 A * | 4/1998 | Giuliano et al. | 362/612 |
| 6,446,518 B1 * | 9/2002 | Hamilton et al. | 73/866.3 |
| 6,584,714 B1 * | 7/2003 | Wehrmann et al. | 40/546 |
| 7,144,131 B2 * | 12/2006 | Rains | 362/231 |
| 7,347,574 B2 | 3/2008 | Kraus | |
| 7,374,323 B1 * | 5/2008 | Kelman et al. | 362/489 |
| 7,494,256 B1 | 2/2009 | Kelman et al. | |
| 7,726,856 B2 * | 6/2010 | Tsutsumi | 362/510 |
| 7,928,859 B1 * | 4/2011 | Li et al. | 340/815.78 |
| 2007/0053208 A1 * | 3/2007 | Justel et al. | 362/629 |
| 2009/0067194 A1 * | 3/2009 | Sanchez | 362/618 |
| 2010/0110657 A1 | 5/2010 | Weindorf | |

FOREIGN PATENT DOCUMENTS

| | | |
|---|---|---|
| DE | 19839197 A1 | 3/2000 |
| DE | 102006026355 A1 | 12/2006 |
| DE | 102006053906 A1 | 5/2008 |
| DE | 102007033568 A1 | 1/2009 |
| DE | 102009046325 A1 | 5/2010 |
| EP | 0704342 A2 | 4/1996 |

* cited by examiner

DISPLAY APPARATUS FOR A VEHICLE AND METHOD FOR PRODUCING THE DISPLAY APPARATUS

CROSS-REFERENCE TO RELATED APPLICATION

This application claims priority to German Patent Application No. DE 10 2011 016 428.6, filed Apr. 8, 2011, which is incorporated herein by reference in its entirety.

TECHNICAL FIELD

A display apparatus for a vehicle and a method for producing the display apparatus are described. The display apparatus comprises at least one transparent plastic plate having a front side and a rear side as well as having an edge surface surrounding the plastic plate. The display apparatus has at least one switchable light source directed onto the edge surface of the plastic plate.

BACKGROUND

Known from DE 10 2009 046 325 A1 is an instrument panel as a display apparatus which comprises a nanophosphor indicia which is not visible under normal lighting conditions and poor light conditions but emits visible light in response to UV light. To this end, the nanophosphor indicia is applied two-dimensionally as a coating to a substrate and is illuminated at an angle from the front or from behind by a switchable UV light source in order to make the nanophosphor indicia visible. This display apparatus has the disadvantage of a complex structure and uses a pollutive, ozone-generating UV light source, and the eyes of the observer must be protected from its radiation.

It is at least one object to provide a display apparatus for a vehicle which is environmentally friendly and which can be used flexibly. A further object is to provide a method for producing such a display. In addition, other objects, desirable features and characteristics will become apparent from the subsequent summary and detailed description, and the appended claims, taken in conjunction with the accompanying drawings and this background.

SUMMARY

A display apparatus for a vehicle and a method for producing the display apparatus are described. The display apparatus comprises a transparent plastic plate having a front side and a rear side as well as having an edge surface surrounding the plastic plate. The display apparatus has a switchable light source of visible light directed onto the edge surface of the plastic plate. The plastic plate has transparent display elements, which are disposed as limited zones inside the plastic plate and have light-sensitive dopant particles. When the light source is switched on, the dopant particles scatter the light so that the display elements become visible from the top.

Such a display apparatus comprising a transparent plastic plate does not impede the view of the driver. Consequently, it can be disposed on the inner surface of a windshield and therefore can be disposed in the field of view of the driver. The driver can thus observe the road traffic unimpaired by the display apparatus and, if required, can have important operating data and driving parameters, such as speed, engine speed, cooling water temperature, or tank level, displayed without diverting his attention from the road traffic.

The transparent display apparatus further can be inserted in a central instrument panel in front of a flat screen that provides additional information which is unfiltered and clearly identifiable as a result of the transparent display apparatus. Thus, navigation information and maps can be disposed either overlapping with, for example, a display apparatus in the form of a pointer instrument of the same transparent plastic disc or next to such an instrument area of the display apparatus.

A large variety of instrumentation of a vehicle in, on, and behind the windshield as far as compact central instrument panels having integrated navigation displays and other helpful additional functions is thus obtained, which is arranged clearly behind the transparent plastic plate and can be made available to the driver of the vehicle.

For the instrumentation, in a further embodiment the transparent display elements in the plastic plate are disposed in a ring shape to a central display instrument of the vehicle. At the same time, the different display elements can be disposed in different flat zones of the transparent plastic disc. For example, a ring of scaling elements can be provided in a first flat zone. In a second flat zone located deeper when viewed from the upper side, a ring of numerical values, for example, can be provided, these being excited to light up by an edge-side light source. In a lowest flat zone when viewed from the upper side, a homogeneous distribution of dopant particles can be provided so that this deeper region can serve as back-lighting of the display apparatus when light is coupled in at the edge.

At the same time, the individual zones can be excited to light up by differently colored light sources such as light-emitting diodes especially as the dopant particles provided do not transform the light wavelength, as in the case of UV radiation, but merely scatter the edge-side emission contained inside the plastic plate due to total reflection at the rear side and front side in a broad-band manner at the light-sensitive dopant particles and do not transform into different light wavelengths.

In a further embodiment, it is provided that the display apparatus comprises at least one second plastic plate having homogeneously distributed light-sensitive dopant particles, which are illuminated by an optical beam and form an optical pointer, wherein the optical beam couples light into edge surfaces of a central opening or into outer edge surfaces of the second plastic plate. Such a pointer display can be achieved by a plurality of technical aids. Furthermore, it is also possible to equip the aforementioned screen, which is visible through the transparent plastic plate, with a pointer function so that such a pointer is visible through the transparent plastic plate. In this regard, an additional plastic plate with suitably homogeneously doped dopant particles can be dispensed with.

Furthermore, it is also possible that a plurality of plastic plates having different transparent display elements such as scaling elements, numbers, or symbols can be joined to one another in different display planes to form a display instrument in order to separate the different light coupling-in planes from one another. A transparent adhesive is provided for joining the plurality of plastic plates, which additionally promotes the total reflection at the respective front and rear sides of the joined-together plastic plates through a suitably provided difference in the refractive index.

In a further embodiment, the plastic plate is formed of poly (methyl methacrylate) (PMMA), such as Plexiglas available from Altuglas International of Bristol, Pa., which is partially and selectively doped with dopant particles in the regions of the display elements. The doping methods required for the selective introduction of dopant particles into such PMMA disks are presently being developed. In this case, the transparent display elements can comprise two- or three-dimensional scaling elements, numbers, or symbols made of a PMMA material provided with light-sensitive dopant particles.

Such transparent display means can be manufactured or arranged separately two- or three-dimensionally as scaling elements, numbers, or symbols and then potted into a plate-shaped transparent plastic compound. In addition, it is also possible to provide three-dimensional recesses for the display elements in a transparent PMMA disk, which are then filled with plastic material enriched with dopant particles. Three-dimensional pre-fabricated display elements comprising a transparent plastic can be glued into these recesses of the PMMA plate.

A possible method for producing a display apparatus for a vehicle comprises the following process steps. Firstly, dimensionally stable three-dimensional transparent display elements made of a plastic compound that can be excited to light up in color are produced. These display elements are then embedded in a transparent plastic plate made of a transparent plastic compound. Such embedding can be accomplished, as has already been mentioned above, by injection molding of a plate-shaped transparent plastic compound with inclusion of the three-dimensional display elements in the plastic compound. Embedding by incorporating the dimensionally stable three-dimensional transparent display elements in recesses of a plastic plate made of PMMA material is also possible. A switchable light source with a light bundle directed onto an edge surface of the transparent plastic plate is then applied.

With the contemplated method, relatively flat transparent display apparatuses as far as the film thickness itself can be attached in the area of the windshield and thus provide a significant gain in driving safety since the vehicle driver is not diverted from the road traffic in order to check the operating parameters of the vehicle.

To this end, the display elements can be disposed in a circular manner for a central display instrument. It is also possible to place a light-emitting diode strip around such an edge face of the plastic plate as the light source but this irradiation means can only be provided in a restricted manner, for example, in a lower edge if the display apparatus is to be provided in the area of the windshield.

For a colored backlighting it is possible to dope a plastic plate homogeneously with dopant particles and illuminate from the outer edge sides. When the edge-side illumination source is switched on, a backlighting is therefore provided and when the light source is switched off, the plastic plate remains transparent.

In a further modification of the method, for a pointer display it is provided to dope a plastic plate homogeneously. A movable optical beam from edge surfaces of a central opening or from outer edge surfaces of the plastic plate illuminates the homogeneously distributed dopants as a pointer or as a display region.

It is further provided to glue a homogeneously doped plastic plate with an optical pointer and a selectively doped plastic plate with display elements onto one another with transparent plastic to form a display instrument.

A further modification of the method for producing a display apparatus for a vehicle provides the following process steps. Firstly a first PMMA plate is selectively doped with light-sensitive dopant particles in zones which are intended to make the display elements light up under edge-side illumination. In addition, a second PMMA plate is homogeneously doped with dopant particles and a central opening for arrangement of a movable laser beam pointer is incorporated in the PMMA plate. A pivotable deflecting mirror or a rotatable prism is then inserted in the opening of the homogeneously doped second PMMA plate, which rotatably deflects a stationary laser beam directed centrally onto the opening as a light pointer toward the edge surfaces of the opening. Finally, the first PMMA plate is seamlessly joined to the second PMMA plate to form a display instrument.

Using this method, a plurality of transparent display apparatuses for vehicles that are inexpensive to manufacture can be provided.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
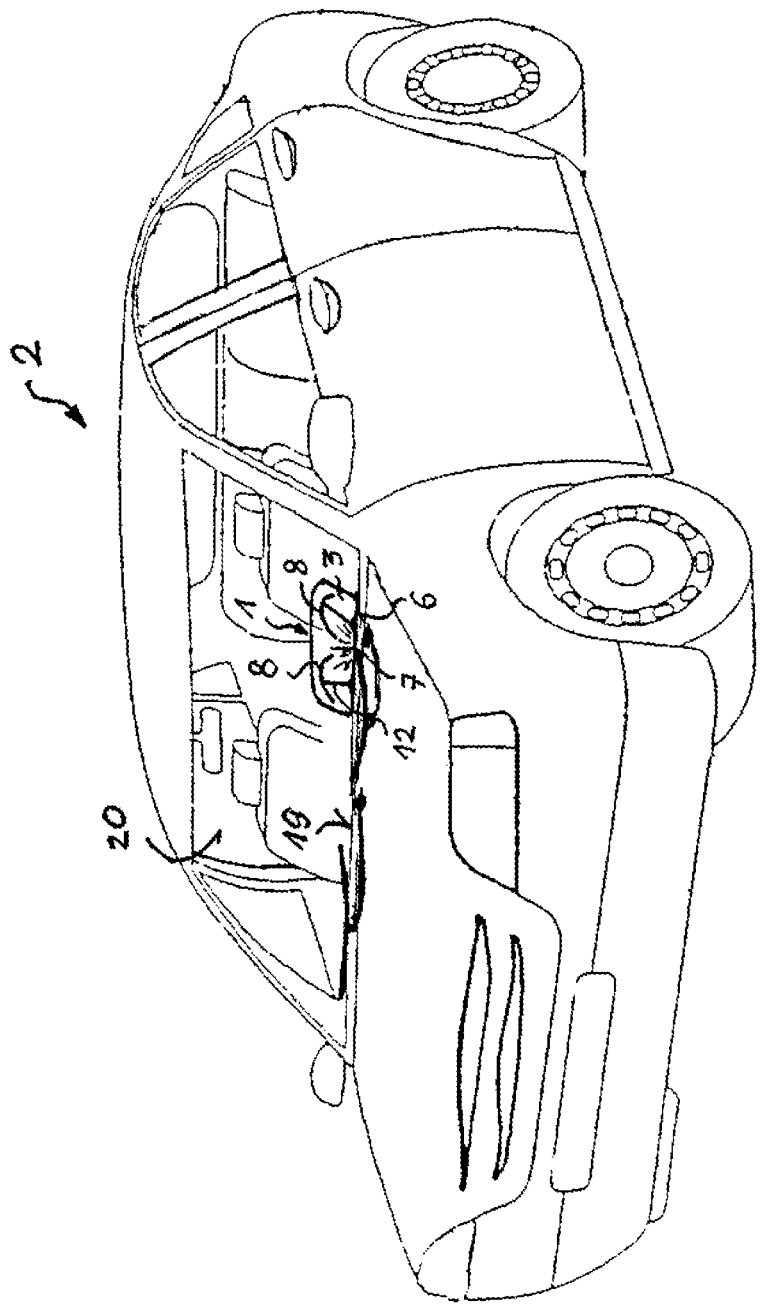
FIG. 1 shows a schematic view of a vehicle with a display apparatus in the area of a windshield in accordance with an exemplary embodiment.

FIG. 1 shows a schematic view of a vehicle 2 with a display apparatus 1 in the area of a windshield 20. In this case, the display apparatus 1 is made of a transparent plastic with arcuately disposed transparent display elements 8, which become visible when the display apparatus 1 is illuminated at the edge by a light source 7. In this case, the light source 7 is located below a lower edge 19 of the windshield 20 so that it is not visible. The arcuate arrangement of display elements 8 becomes visible when light source 7 is switched on below the edge 19 of the windshield 20. The border of the display apparatus 1 made of transparent plastic shown in FIG. 1 is barely visible in practice even when the display elements 8 arranged in an arcuate manner in a transparent plastic plate 3 light up in color in the plastic plate 3 and, for example, clearly display the speed and/or engine speed on the windshield 20.

Figure 2:
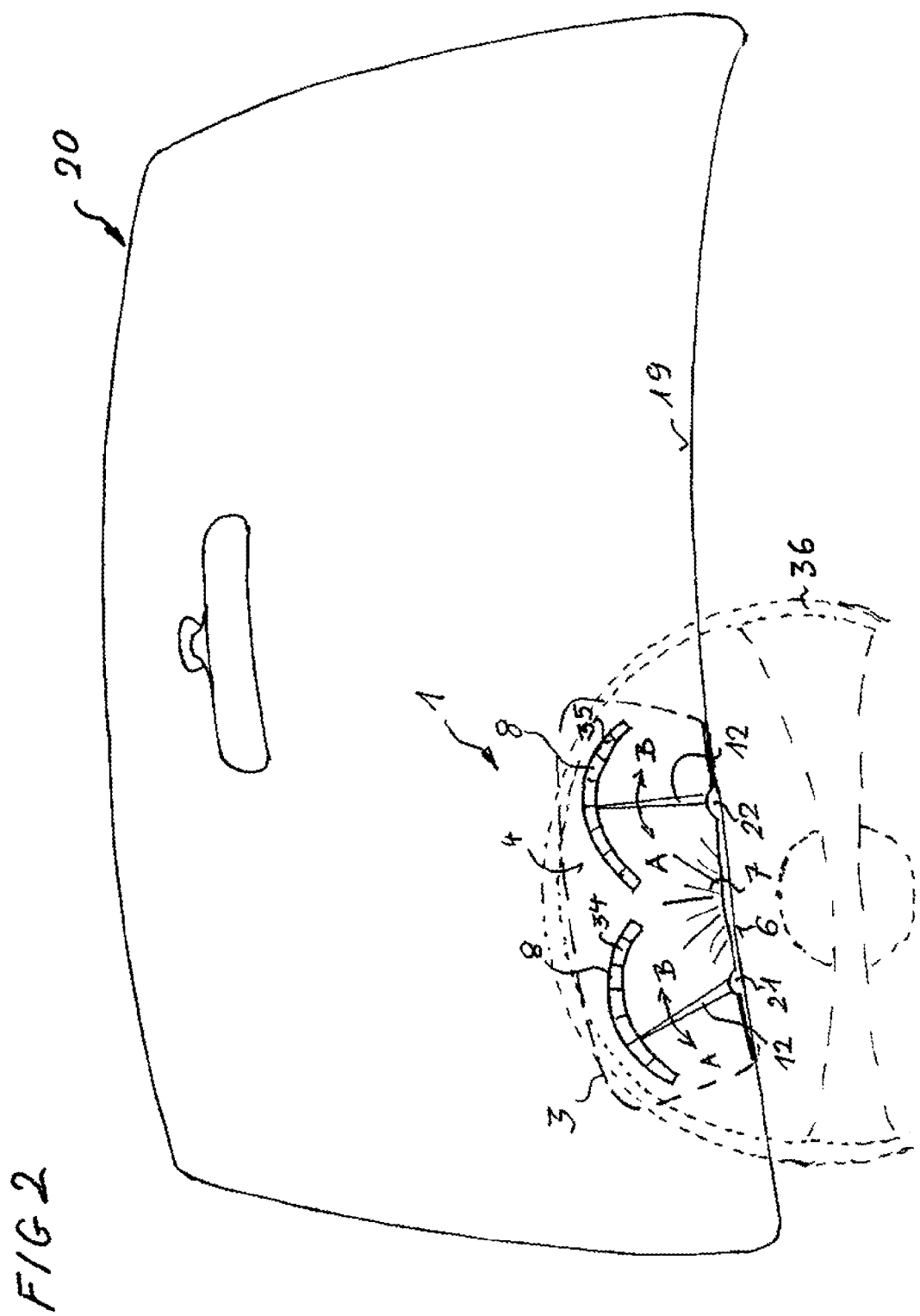
FIG. 2 shows the display apparatus of FIG. 1 in the area of the windshield in detail.

FIG. 2 shows the display apparatus 1 in the area of the windshield 20 in detail, where the position of a steering wheel 36 is indicated by dashed lines. The transparent plastic plate 3 or plastic film has a front side 4 directed toward the vehicle interior. In the center or along a lower edge face 6 of the plastic plate 3 or plastic film, the light source 7 is disposed in a first plastic plane adjoining the front side 4 and the arcuately disposed display elements 8 only become visible when the light source 7 is switched on. Since the display apparatus 1 consists of a transparent plastic plate 3 or plastic film, the driver's view of the road traffic is not restricted, especially as the arcuately disposed display elements 8 are transparent and only light up in color as a result of switching on the light source 7 located at the edge.

Another plastic plate 3 or plastic film is glued with its front side onto the rear side of the plastic plate 3 or plastic film with a transparent plastic adhesive. The rear plastic plate or film differs from the front one in that display elements 8 are not introduced selectively into the rear plastic plate 3 or film but the rear plastic plate or film is doped homogeneously with light-sensitive dopant particles, which however are not visible.

These particles light up under edge-side irradiation. For this purpose, light beams are provided for two display instruments 34 and 35 shown here, which are projected into the rear plastic plate or film at coupling-in points 21 and 22 and can be pivoted in the directions of the arrows A, B so that with these pivotable optical pointers, it is possible to display values, for example, for speed and engine speed to the driver by means of this optical pointer without the view of the traffic situation outside the vehicle being impaired. It is also possible to show the display elements in color by the optical pointer through different color projections from the edge face 6.

Consequently, in this embodiment two display instruments 34 and 35 are provided to display the speed of the vehicle through the display instrument 34 and to display the engine speed through the display instrument 35 on the windshield 20. To this end, in addition to the arcuately disposed display elements 8, respectively one of a number of optical pointers 12 is provided, which can be pivoted in the directions of the arrows A and B. The optical pointers 12 are merely pivotable light beams, which are coupled in via coupling-in points 21 and 22 for each display instrument 34 and 35 from an edge face 6. In this case, each light beam is scattered at light-sensitive dopant particles distributed homogeneously in one plane of the plastic plate 3 or plastic film and is visible at the front side 4 as optical pointer 12.

Figure 3:
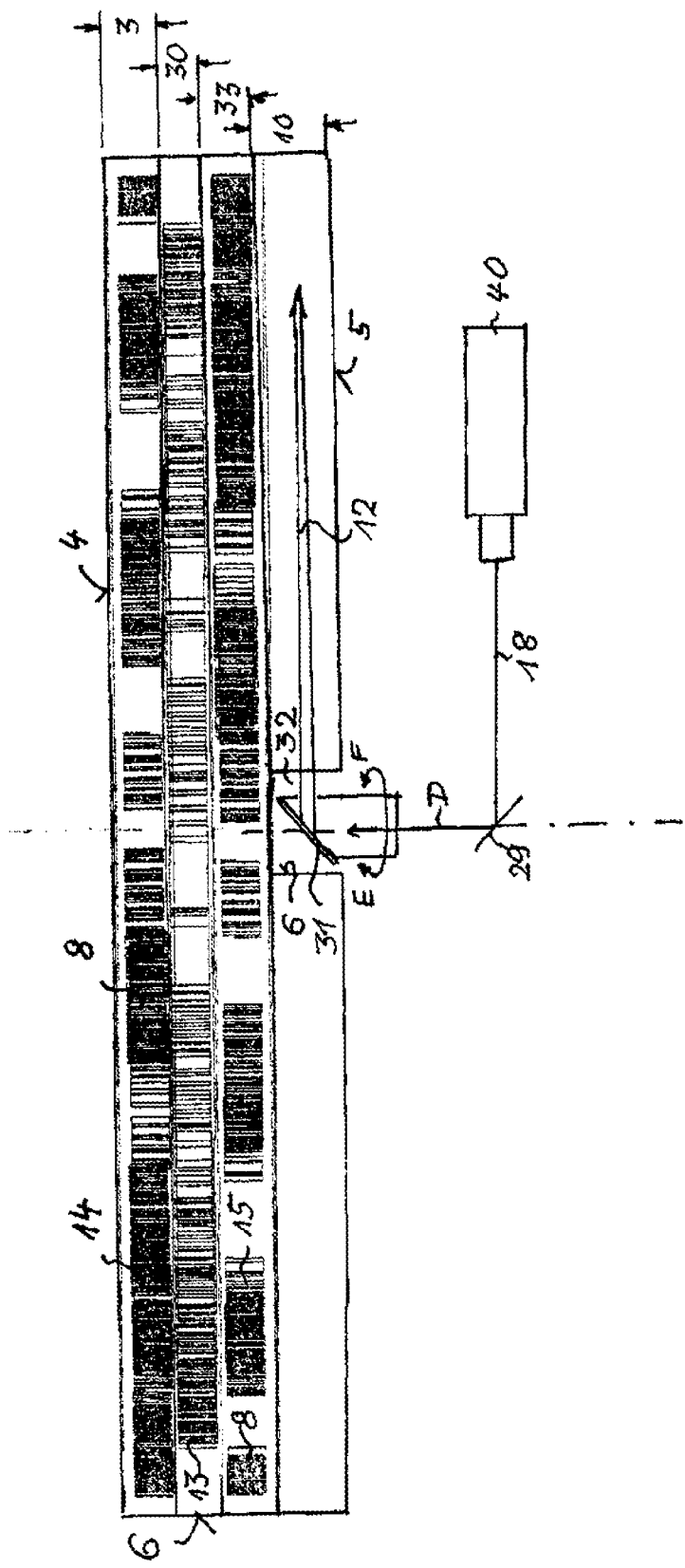
FIG. 3 shows a schematic cross-section through a display apparatus with optical pointer.

FIG. 3 shows a schematic cross-section through a display apparatus 1 with an optical pointer 12, with which the values of the display elements 8 are indicated. The display elements 8 are disposed in three layers or transparent plastic plates 3, 30, and 33. In the uppermost plastic plate 3, for example, transparent three-dimensional numbers 14 are embedded as display elements 8. Scaling elements 13 or symbols 15 are arranged in a ring shape in the plastic plates 30 or 33 or plastic layers located thereunder.

The optical pointer 12 is pivoted by a rotatable deflecting mirror 31 or a rotatable prism whereby, for example, a stationary laser beam 18 is deflected via a stationary deflecting mirror 29 toward the rear side 5 in the directions E and F of pivotable deflecting mirrors 31 and couples in the laser beam in the direction of the edge face 6 of a central opening 32 of a disk-shaped display apparatus 1.

In this case, the deflecting mirror 31 or the prism is pivoted according to the measured values by a corresponding angle from a zero position in the direction of the arrow F or E so that the optical pointer scatters the light in the region of the deflected laser beam 18 of a laser beam device 40 such that from the upper side 4 of the transparent first uppermost plastic plate 3, a luminous pointer 12 is visible in the homogeneously doped lowest plastic plate 10. To this end, the drive of the deflecting mirror or the prism is electrically connected via a controller to the respective measuring transducer such as a speed sensor, an engine speed sensor, or a temperature sensor.

Figure 4:
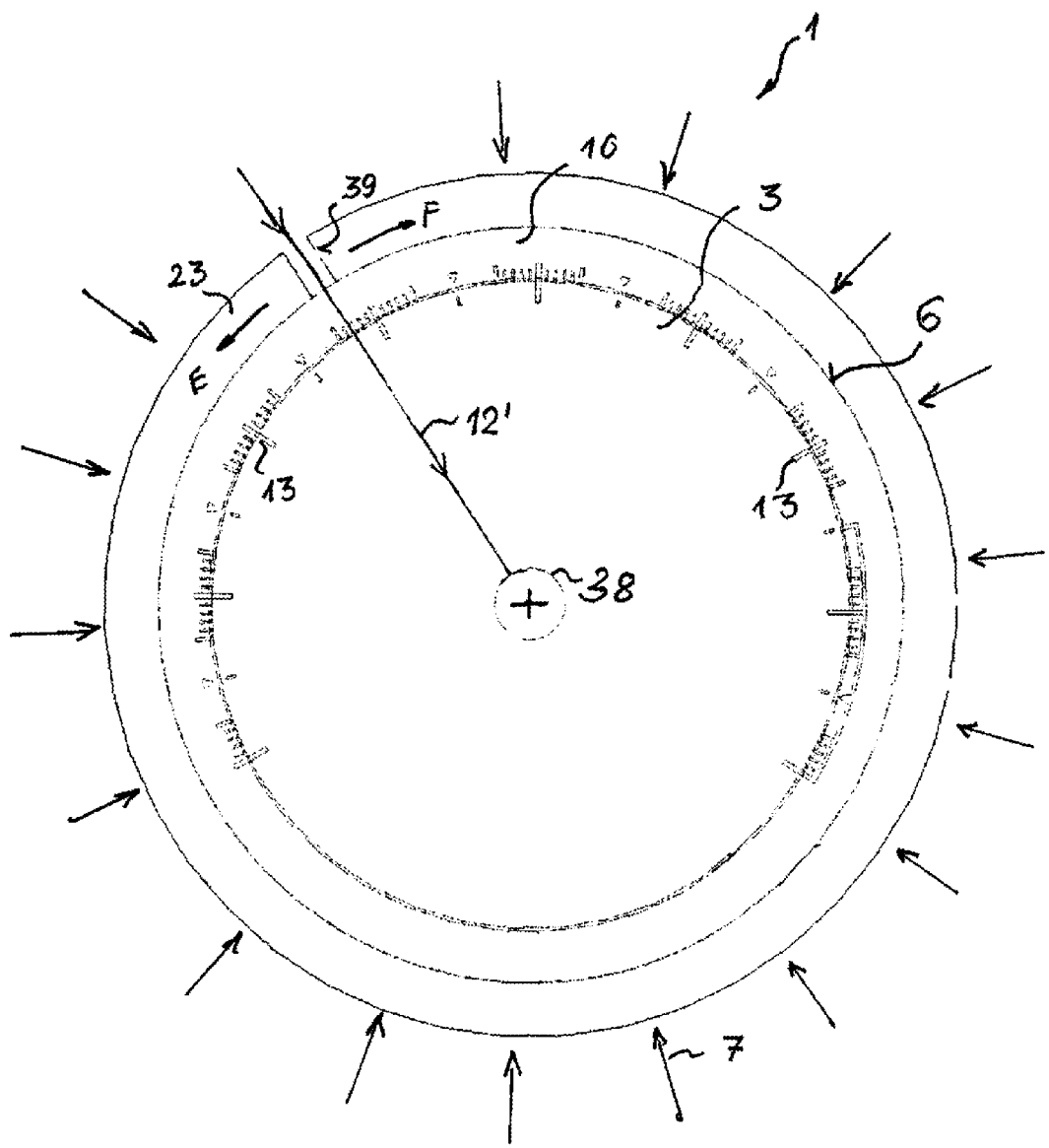
FIG. 4 shows a schematic plan view of a display apparatus with optical pointer of another embodiment.

FIG. 4 shows a schematic plan view of a display apparatus with optical pointer 12' of another embodiment. The pointer 12' differs from the pointer 12 shown in FIG. 3 in that a single laser beam is not coupled into the central coupling-in points 21 or 22 but the disk-shaped display apparatus 1 is surrounded in its outer edge face 6 by an optically opaque ring 23, which covers the edge face 6 of the disk-shaped homogeneously doped plastic plate 10 apart from a tubular opening 39. Through the tubular opening light can shine onto the homogeneously doped plastic plate 10 so that the optical pointer flag is visible toward the center as an optical pointer 12'. In this case, an optically opaque region 38 can be provided at the center, which delimits the length of the optical pointer 12'.

In this view according to FIG. 4, it should be noted that a lower disk-shaped plastic plate 10 homogeneously doped with dopant particles is provided to show the pointer and a first disk-shaped plastic plate 3 is located thereover, the edge faces 6 whereof are not shielded by an optically opaque ring 23 so that the scaling elements 13 disposed in the first plastic plate 3 light up.

The two plastic plates are seamlessly joined by means of a transparent plastic adhesive having a refractive index that promotes total reflection of light projected from the edge so that under edge-side exposure to light, only the light-sensitive dopant particles at which the light is scattered light up.

Figure 5:
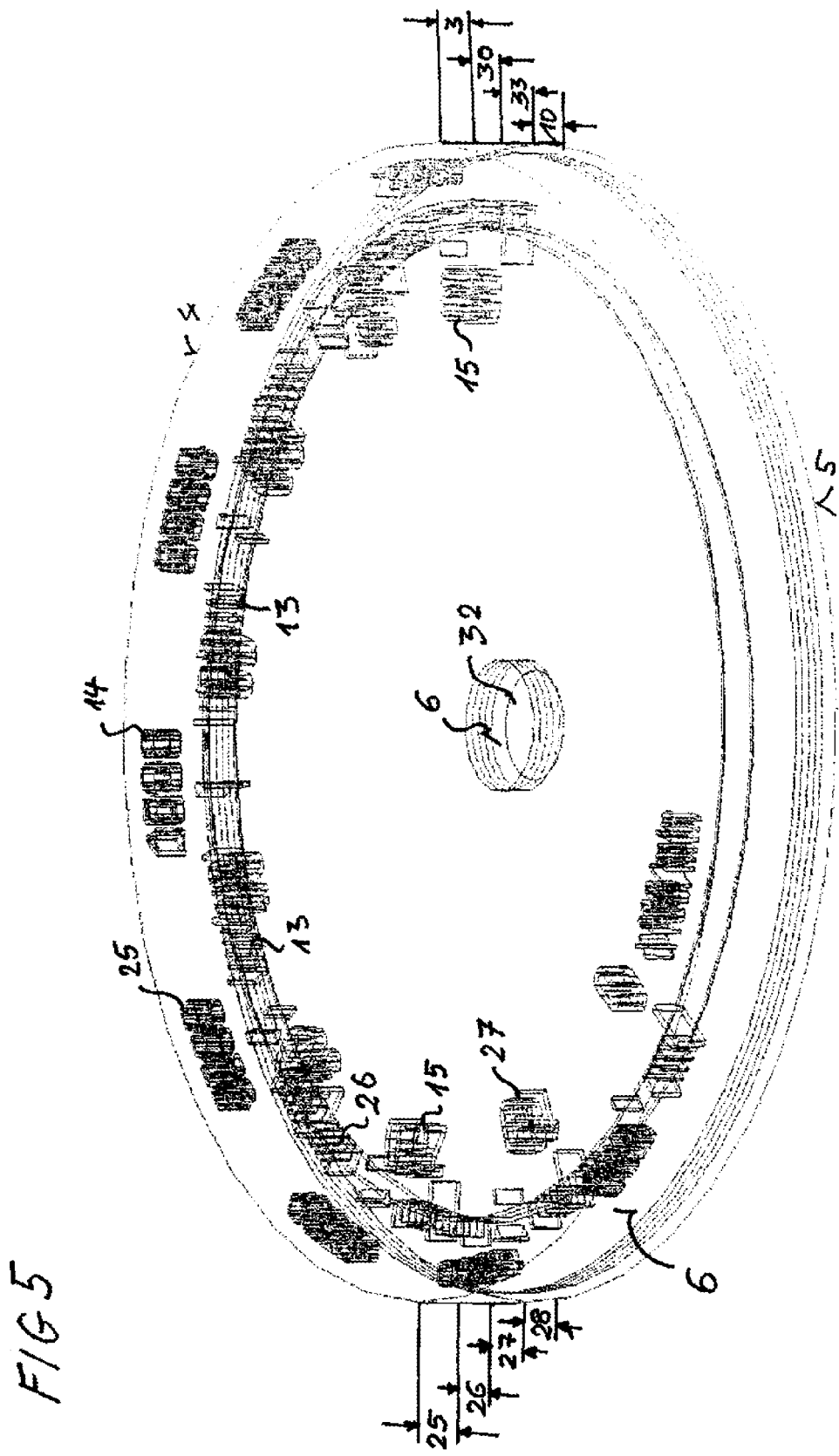
FIG. 5 shows a schematic perspective view of a display apparatus with flat display zones in accordance with a further embodiment.

FIG. 5 shows a schematic perspective view of a display apparatus 1 with different display zones 25, 26, 27, and 28. These display zones 25 to 28 can be achieved by disk-shaped plastic plates 3, 10, 30, and 33 glued onto one another. Whereas numbers 14 are introduced in the uppermost first disk-shaped plastic plate 3 as display elements, scaling elements 13 are provided in the second disk-shaped plastic plate 30 below the first disk-shaped plastic plate 3, and finally symbols 15 are disposed in another disk-shaped plastic plate 33. The lowest disk-shaped plastic plate 10 is homogeneously doped with dopants and can thus be used either as a disk-shaped plastic plate 10 for an optical pointer or for a backlight.

For a backlight the annular edge face 6 of the lower disk-shaped plastic plate 10 is uniformly irradiated. For an optical pointer display, as already discussed above, a central opening can be provided, in which the edge face 6 can be used, for example, for coupling in a pivotable laser beam, as shown in FIG. 3.

Figure 6:
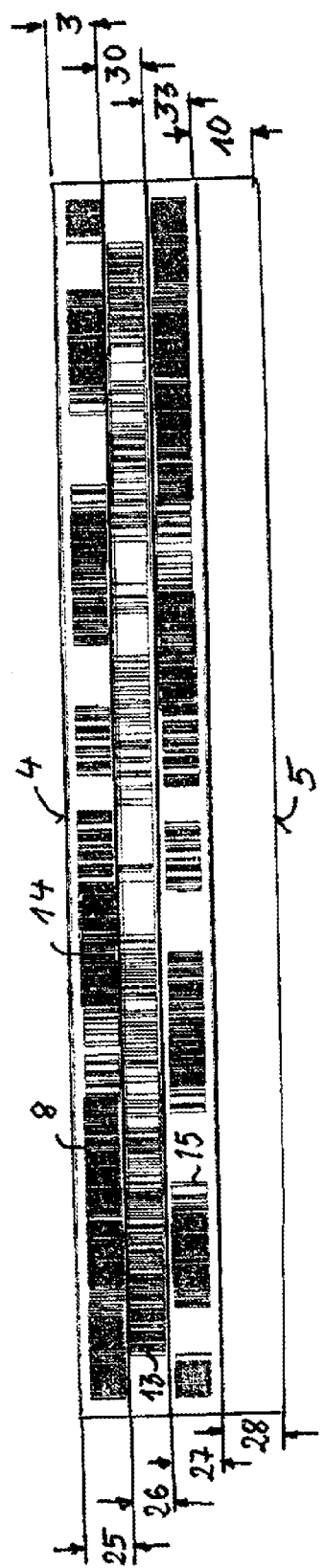
FIG. 6 shows a schematic side view of the display apparatus according to FIG. 5.

FIG. 6 shows a schematic side view of the display apparatus according to FIG. 5. The four display zones 25, 26, 27, and 28 layered onto one another are achieved by the corresponding disk-shaped plastic plates 3, 10, 30, and 33. The plastic plates 3, 10, 30, and 33, are joined onto one another with a transparent adhesive. This adhesive promotes the total reflection of the light projected via the edge faces 6 into the plastic plates 3, 10, 30, and 33 as a result of a suitably large difference in the refractive index of the transparent plastic layer compared with the refractive index of the plastic plates 3, 10, 30, and 33.

As already mentioned, three-dimensional number elements are disposed in the uppermost plastic plate 3, scaling elements 13 on the one hand and symbols 15 on the other hand are suitably disposed in the central plastic plate 30 or 33, and in this form the lower homogeneously doped disk-shaped plastic plate 10 is used to represent a backlight. This backlight only becomes visible when light is coupled into the edge face 6 of the lowest plastic plate so that the homogeneously distributed dopant particles light up.

Figure 7:
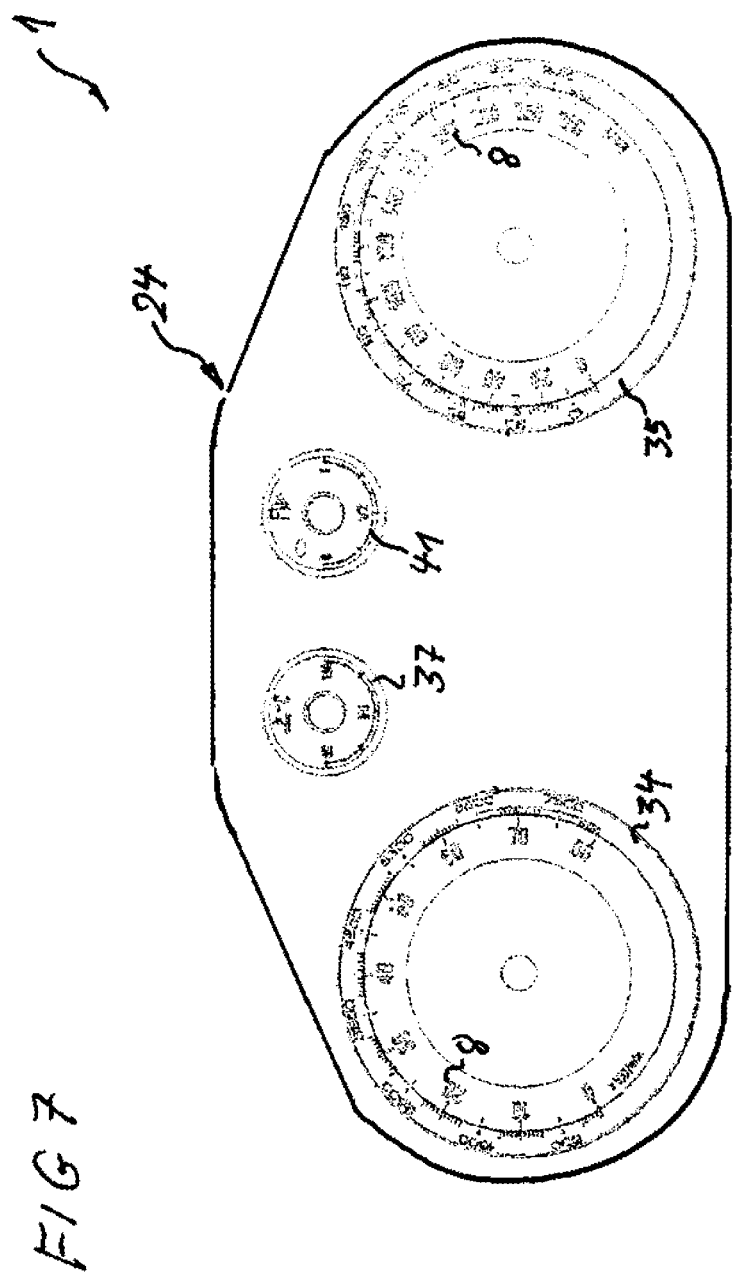
FIG. 7 shows a schematic plan view of a display apparatus comprising a plurality of display instruments of an instrument panel according to a further embodiment.

FIG. 7 shows a schematic plan view of a display apparatus 1 comprising a plurality of display instruments 34, 35, 37, and 41 of an instrument panel 24 according to a further embodiment. In this case, the optical pointers provided individually for each display instrument are omitted and only annular scalings for the individual display instruments are shown when light is incident from the edge faces on the individual display zones of a display instrument.

In this instrument panel 24, a scaling for the vehicle speed becomes visible with the display instrument 34, a scaling for the engine speed becomes visible with the display instrument 35, a scaling for the cooling water temperature becomes visible with the display instrument 37, and a scaling for the tank filling becomes visible with the display instrument 41 when light is coupled in at the edge.

Figure 8:
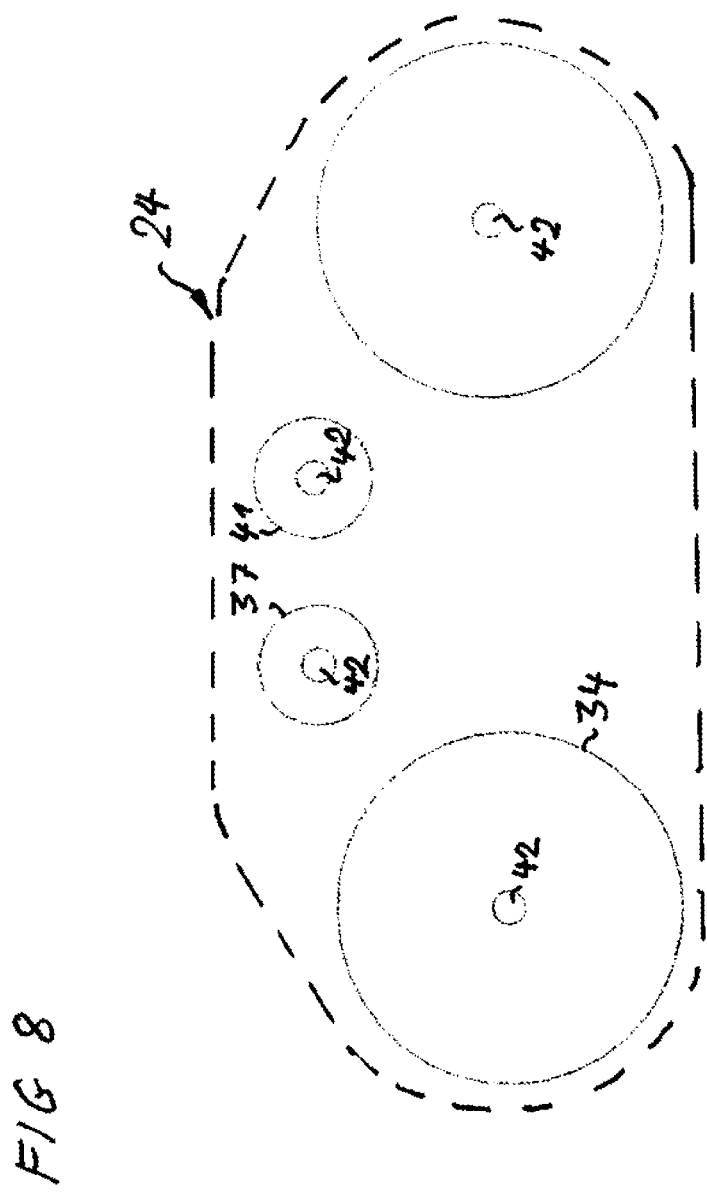
FIG. 8 shows a schematic plan view of the display apparatus according to FIG. 7 when the light source is switched off.

FIG. 8 shows a schematic plan view of the instrument panel 24 according to FIG. 7 when the light sources are switched off so that only the edge faces 6 stand out and possibly cover caps 42 for deflecting mirrors of optical pointers can be seen at the center of the display instruments 34, 35, 37, and 41.

Figure 9:
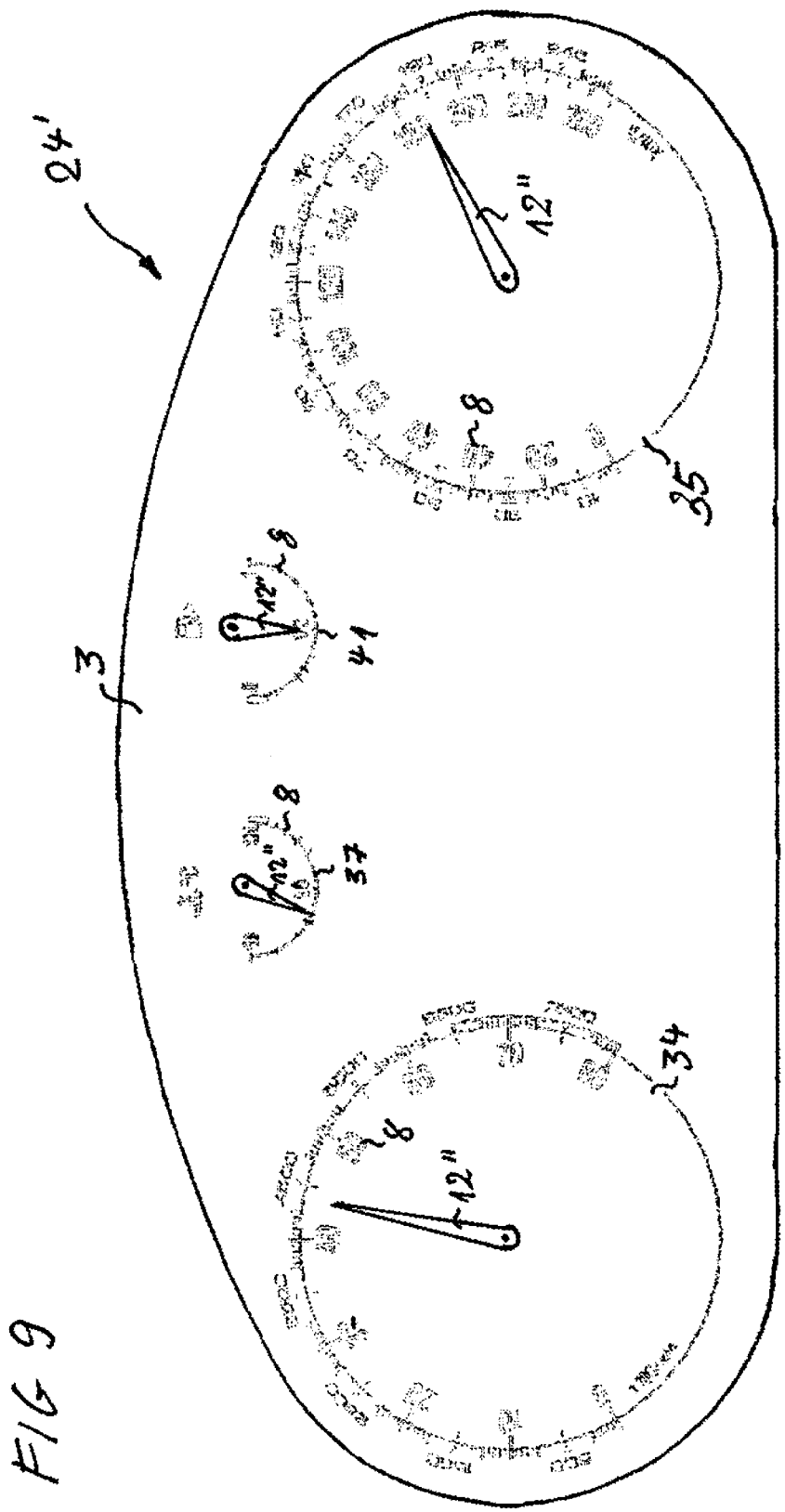
FIG. 9 shows schematically a front view of an instrument panel according to a further embodiment.

FIG. 9 shows schematically a front view of another instrument panel 24' according to a further embodiment. The instrument panel 24' of this embodiment comprises a single plastic plate 3 in which four display instruments 34, 35, 37, and 41 with annular or arcuately disposed display elements 8 are provided, which however have a pointer function without light being coupled in at the edge. On the contrary, this pointer function uses the transparency of the plastic plate 3, in which a flat screen is disposed behind the plastic plate 3 on which the pointer functions are imaged as pivotable optical pointers 12".

Figure 10:
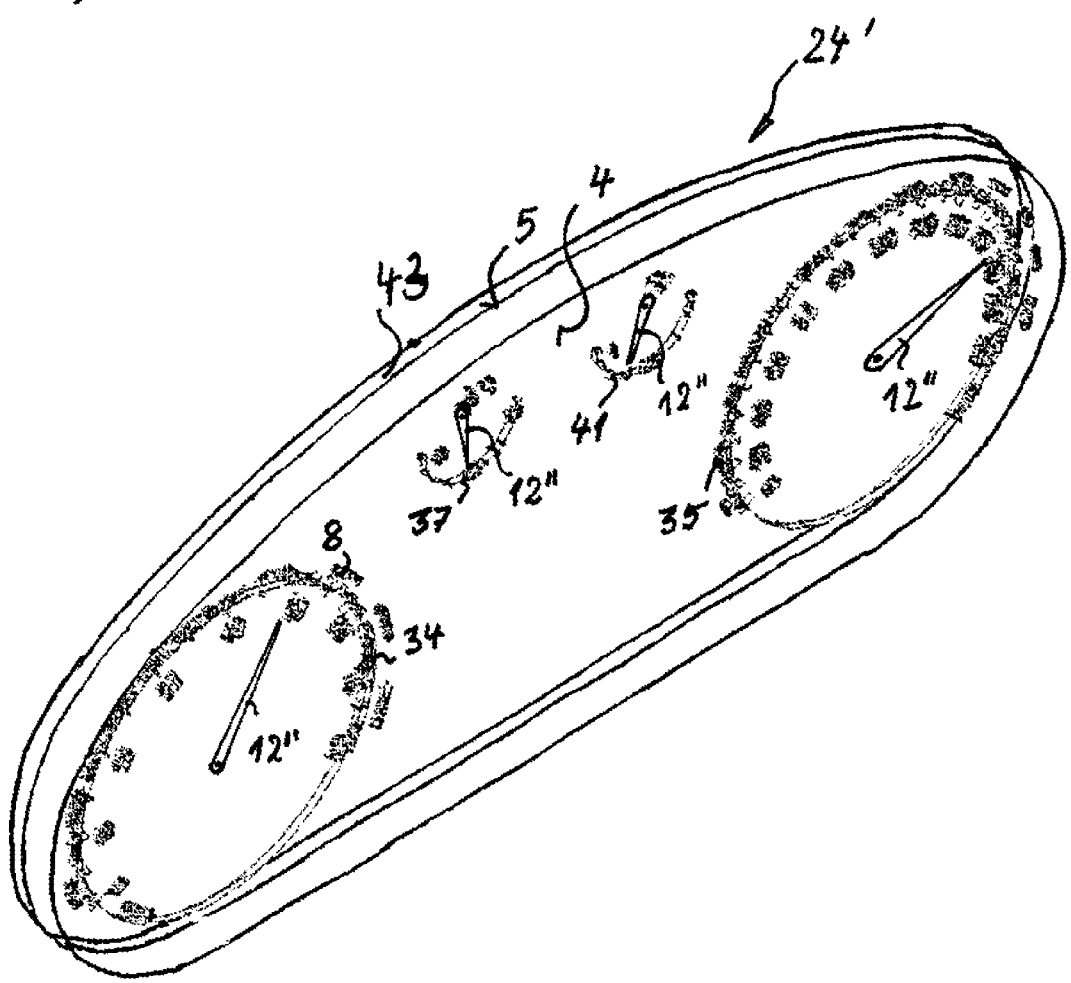
FIG. 10 shows schematically a perspective view of the instrument panel according to FIG. 9.

FIG. 10 shows schematically a perspective view of the instrument panel 24' according to FIG. 9 with the plastic plate 3 and the flat screen 43 disposed on the rear side of the plastic plate 3 as well as a display of the optical pointer 12. Furthermore, additional information can be displayed with the aid of the flat screen 43.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A display apparatus for a vehicle comprising:
   a transparent plastic plate having a front side, a rear side, and an edge surface surrounding the transparent plastic plate;
   a switchable light source of visible light directed onto the edge surface of the transparent plastic plate; and
   a second plastic plate arranged behind the transparent plate having homogeneously distributed light-sensitive dopant particles that are configured to be illuminated by an optical beam to form an optical pointer, wherein the optical beam is configured to coupled light into edge surfaces of a central opening or into outer edge surfaces of the second plastic plate;
   wherein the transparent plastic plate has transparent display elements that are disposed as limited zones inside the transparent plastic plate and have light-sensitive dopant particles and wherein when the switchable light source is switched on, the light-sensitive dopant particles scatter the visible light so that the transparent display elements become visible from the front side.

2. The display apparatus according to claim 1, wherein the transparent display elements in the transparent plastic plate are disposed in a ring shape to a central display instrument of the vehicle.

3. The display apparatus according to claim 1, wherein a plurality of plastic plates having different transparent display elements are joined in different display regions to form a display instrument.

4. The display apparatus according to claim 1, wherein the transparent plastic plate comprises poly(methyl methacrylate) partially and selectively doped with dopant particles in regions of the transparent display elements.

5. The display apparatus according to claim 4, wherein the transparent display elements comprising poly(methyl methacrylate) partially and selectively doped with the dopant particles are disposed in three-dimensional recesses of the transparent plastic plate.

6. The display apparatus according to claim 1, wherein the transparent display elements comprise two- or three-dimensional scaling elements, numbers, or symbols comprising poly(methyl methacrylate) provided with the light-sensitive dopant particles and potted into a plate-shaped transparent plastic compound.

7. The display apparatus according to claim 1, wherein a flat screen on the rear side of the transparent plastic plate is configured to transmit additional information through the display apparatus.

8. A method for producing a display apparatus for a vehicle, the method comprising the steps of:
   producing dimensionally stable three-dimensional transparent display elements made of a plastic compound configured to be excited to light up in color,
   embedding the dimensionally stable three-dimensional transparent display elements in a transparent plastic plate made of a transparent plastic compound;
   disposing the dimensionally stable three-dimensional transparent display elements in a circular manner for a central display instrument; and
   applying a switchable light source with a light bundle directed onto an edge surface of the transparent plastic plate.

9. The method according to claim 8, using a light-emitting diode strip as the switchable light source.

10. The method according to claim 8, wherein the transparent plastic plate is further homogeneously doped with dopants and a movable optical beam from edge surfaces of a central opening or from outer edge surfaces of the transparent plastic plate illuminates the dopants as a pointer or as a display region.

11. The method according to claim 8, further including a homogeneously doped plastic plate with an optical pointer and a selectively doped plastic plate with display elements glued to one another with transparent plastic to form a display instrument.

12. A method for producing a display apparatus for a vehicle, the method comprising the steps of:
   selectively doping a first poly(methyl methacrylate) plate with light-sensitive dopant particles in zones that make display elements light up under edge-side illumination;
   homogeneously doping a second poly(methyl methacrylate) plate with dopant particles and introducing a central opening for arrangement of a movable laser beam pointer;

attaching a rotatable mirror or prism in the central opening of the second poly(methyl methacrylate) plate, which rotatably deflects a stationary laser beam directed centrally onto the central opening as a light pointer;

connecting the first poly(methyl methacrylate) plate to the second poly(methyl methacrylate) plate.

13. The method according to claim 12, wherein connecting the first poly(methyl methacrylate) plate to the second poly(methyl methacrylate) plate utilizes a transparent adhesive.

* * * * *